(12) United States Patent
Zhao et al.

(10) Patent No.: US 10,061,528 B2
(45) Date of Patent: Aug. 28, 2018

(54) DISK ASSIGNMENT FOR MULTIPLE DISTRIBUTED COMPUTING CLUSTERS IN A VIRTUALIZED COMPUTING ENVIRONMENT

(71) Applicant: VMware, Inc., Palo Alto, CA (US)

(72) Inventors: Binbin Zhao, Beijing (CN); Yonghua Lin Lin, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 28 days.

(21) Appl. No.: 15/161,256

(22) Filed: May 22, 2016

(65) Prior Publication Data

US 2017/0337004 A1 Nov. 23, 2017

(51) Int. Cl.
*G06F 3/06* (2006.01)

(52) U.S. Cl.
CPC .......... *G06F 3/0631* (2013.01); *G06F 3/0604* (2013.01); *G06F 3/0608* (2013.01); *G06F 3/0647* (2013.01); *G06F 3/0667* (2013.01); *G06F 3/0689* (2013.01)

(58) Field of Classification Search
CPC .... G06F 3/0631; G06F 3/0604; G06F 3/0608; G06F 3/0689
See application file for complete search history.

(56) References Cited

U.S. PATENT DOCUMENTS

| | | | | |
|---|---|---|---|---|
| 5,704,055 A * | 12/1997 | George | ............... | G06F 12/0223 711/2 |
| 7,487,228 B1 * | 2/2009 | Preslan | ............. | G06F 17/30067 709/218 |
| 8,924,675 B1 * | 12/2014 | Burke | ................... | G06F 3/0647 711/156 |
| 2007/0204265 A1 * | 8/2007 | Oshins | ................ | G06F 9/45558 718/1 |
| 2012/0054367 A1 * | 3/2012 | Ramakrishnan | ...... | G06F 9/4856 709/242 |
| 2012/0284471 A1 * | 11/2012 | Hur | ........................ | G06F 3/0617 711/162 |
| 2013/0227558 A1 * | 8/2013 | Du | ....................... | G06F 9/45558 718/1 |

(Continued)

OTHER PUBLICATIONS

Siva, "HDFS Rebalance", Hadoop Online Tutorial, Apr. 13, 2014.

*Primary Examiner* — Ryan Bertram
(74) *Attorney, Agent, or Firm* — Su IP Consulting (57) ABSTRACT

Example methods are provided to perform disk assignment for multiple distributed computing clusters in a virtualized computing environment. The method may include determining whether disk assignment is required for a host to support a first virtualized computing instance from a first distributed computing cluster and a second virtualized computing instance from a second distributed computing cluster. The method may also include migrating first data placed on one or more second disks to one or more first disks, reassigning the one or more second disks from the first virtualized computing instance to the second virtualized computing instance, and placing second data on the one or more second disks. The first data may be for access by the first virtualized computing instance to execute a first distributed computing application, and the second data may be for access by the second virtualized computing instance to execute a second distributed computing application.

18 Claims, 6 Drawing Sheets

(56) References Cited

U.S. PATENT DOCUMENTS

| | | | |
|---|---|---|---|
| 2015/0178115 A1* | 6/2015 | Shiva | H04L 12/4641 |
| | | | 718/1 |
| 2015/0370611 A1* | 12/2015 | Amann | G06F 9/5088 |
| | | | 709/216 |
| 2016/0070602 A1* | 3/2016 | Shimogawa | G06F 9/45558 |
| | | | 718/1 |
| 2016/0308783 A1* | 10/2016 | Bookman | H04L 47/822 |
| 2016/0378622 A1* | 12/2016 | Ren | G06F 11/203 |
| | | | 714/4.11 |
| 2017/0031698 A1* | 2/2017 | Mathews | G06F 9/45558 |
| 2017/0031699 A1* | 2/2017 | Banerjee | G06F 9/45558 |

* cited by examiner

DISK ASSIGNMENT FOR MULTIPLE DISTRIBUTED COMPUTING CLUSTERS IN A VIRTUALIZED COMPUTING ENVIRONMENT

BACKGROUND

Unless otherwise indicated herein, the approaches described in this section are not admitted to be prior art by inclusion in this section.

Distributed computing platforms allow workloads to be processed across a cluster of distributed software components that are usually supported by multiple computing devices. For example, Hadoop is an open-source framework for distributed storage and distributed processing of very large data sets. Hadoop splits a data set into blocks and distributes the processing workload across nodes in a distributed computing cluster. This distributed approach enables data to be processed in parallel and more efficiently compared to using a single device or single software instance. In practice, a distributed computing platform may be deployed in a virtualized computing environment. Virtualization allows the abstraction of hardware resources and the pooling of these resources to support virtual machines configured to perform distributed processing. However, it may be challenging to support multiple distributed computing clusters in a particular virtualized computing environment.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
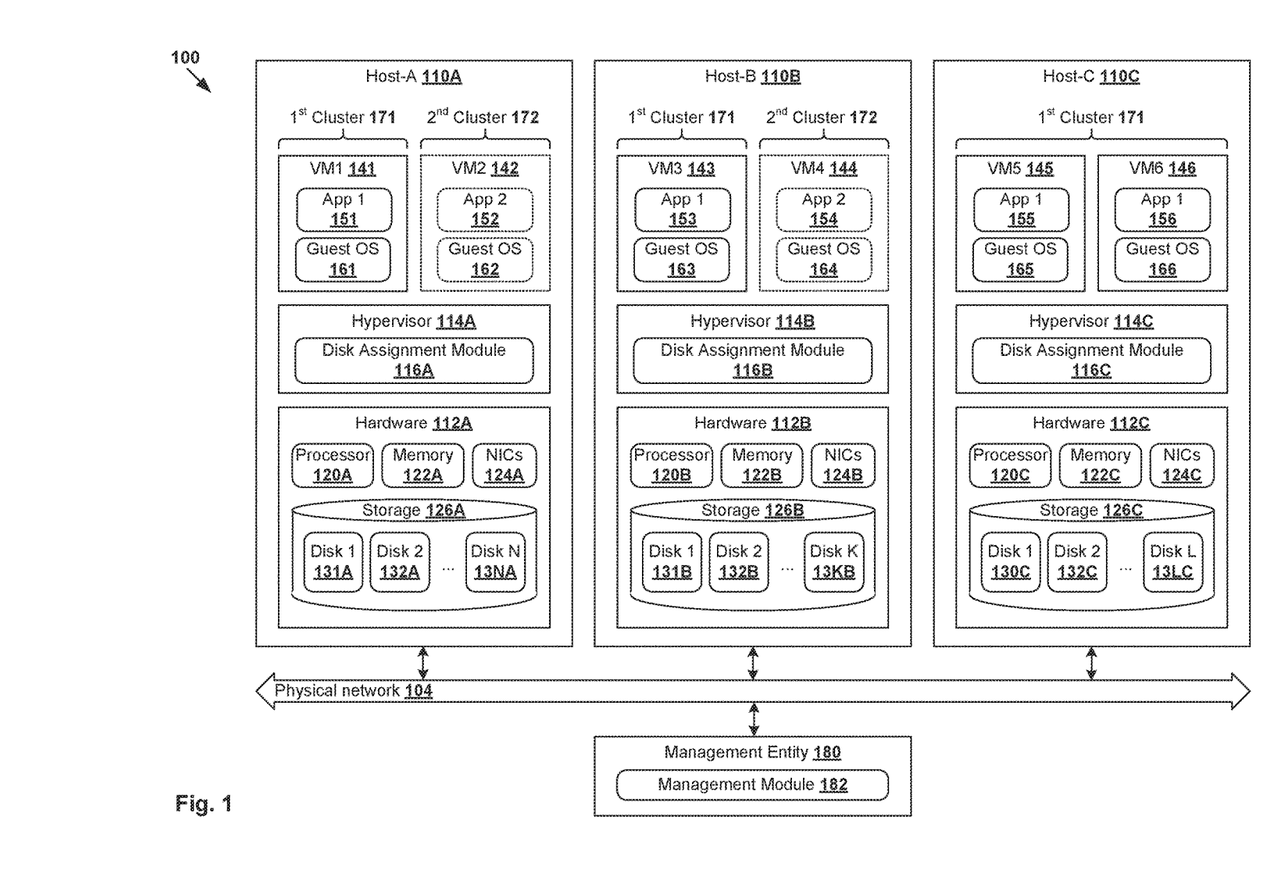
FIG. 1 is a schematic diagram illustrating an example virtualized computing environment supporting multiple distributed computing clusters.

The challenges of operating multiple distributed computing clusters (e.g., Hadoop clusters) will now be explained using FIG. 1. In particular, FIG. 1 is a schematic diagram illustrating example virtualized computing environment 100 supporting multiple distributed computing clusters 171, 172. Although an example is shown, it should be understood that virtualized computing environment 100 may include additional or alternative components, and each component may have a different configuration.

In the example in FIG. 1, virtualized computing environment 100 includes hosts (also known as "host computers", "physical servers", "server systems", "host computing systems", etc.), such as Host-A 110A, Host-B 110B and Host-C 110C. Each host 110A/110B/110C includes suitable hardware 112A/112B/112C and executes virtualization software such as hypervisor 114A/114B/114C to support various virtual machines 141-146 (to be described below). In the following, reference numerals with a suffix "A" relates to elements of Host-A 110A, suffix "B" relates to Host-B 110B, and suffix "C" relates to Host-C 110C. Although three hosts are shown for simplicity, virtualized computing environment 100 may include any suitable number of hosts, each supporting any suitable number of virtual machines.

Although examples of the present disclosure refer to "virtual machines," it should be understood that virtual machines running within a virtualized computing environment are merely one example of "virtualized computing instances." In general, a virtualized computing instance may represent an addressable data compute node, isolated user space instance, etc. In practice, any suitable technologies aside from hardware virtualization may be used to provide isolated user space instances. For example, other virtualized computing instances may include containers (e.g., running on top of a host operating system without the need for a hypervisor or separate operating system such as Docker, etc., or implemented as an operating system level virtualization), physical hosts, client computers, virtual private servers, etc. Virtual machines may also be complete computation environments that contain virtual equivalents of the hardware and system software components of a physical computing system.

Hardware 112A/112B/112C includes any suitable physical resources, such as processor 120A/120B/120C (e.g., central processing unit (CPU)); memory 122A/122B/122C (e.g., random access memory); network interface controllers (NICs) 124A/124B/124C to provide network connection to physical network 104; storage resource 126A/126B/126C, storage controller (not shown for simplicity) to provide access to storage resource 126A/126B/126C, etc. Hypervisor 114A/114B/114C maintains a mapping between physical resources and virtual resources assigned to virtual machines 141-146. For example, corresponding to hardware 112A/112B/112C, the virtual resources may include virtual CPU, virtual memory, virtual disk(s), virtual NIC(s), etc. In practice, hypervisor 114A/114B/114C may also be a "type 2" or hosted hypervisor that runs on top of a conventional operating system on host 110A/110B/110C.

Storage resource 126A/126B/126C represents one or more disks. As used herein, the term "disk" may generally refer to a physical storage device (also known as storage disk, disk drive, etc.) or other memory that can store data for a physical host. In practice, a disk may be housed in or directly attached to host 110A/110B/110C, such as hard disk drive (HDD), solid-state drive (SSD), solid-state hybrid drive (SSHD), peripheral component interconnect (PCI) based flash storage, serial advanced technology attachment (SATA) storage, serial attached small computing system interface (SAS) storage, Integrated Drive Electronics (IDE) disks, Universal Serial Bus (USB) storage, etc.

For example in FIG. 1, storage resource 126A includes N disks labelled "Disk 1" 131A, "Disk 2" 132A to "Disk N" 13NA that are local to Host-A 110A. For Host-B 110B, storage resource 126B includes L disks labelled "Disk 1" 131B, "Disk 2" 132B to "Disk L" 13LB. For Host-C 110C, storage resource 126C includes K disks labelled "Disk 1" 131C, "Disk 2" 132C to "Disk K" 13KC. Note that any suitable values may be used for N, L and K (same value or different values) depending on storage capacity requirements. Disks in storage resource 126A/126B/126C may be connected based on any suitable architecture, such as Just a Bunch of Disks (JBOD) that makes multiple hard disks accessible as independent disks or a combined single logical volume.

Conventionally, one physical host is usually configured to implement one node of a distributed computing cluster. In this case, all disks of the physical host are utilized by a single distributed computing cluster and read/write operations on the disks may be scheduled to optimize performance. In contrast, in a virtualized computing environment, each virtual machine supported by a physical host may serve as a node of a particular distributed computing cluster. Virtualization provides various benefits, such as faster deployment, better resource utilization, elasticity and multi-tenancy. However, since one physical host may support multiple virtual machines, the disks of the physical host will be utilized by multiple distributed computing clusters. This causes disk contention among the virtual machines, thereby adversely affecting cluster performance.

For example in FIG. 1, virtual machines 141-146 are provisioned and deployed to execute different distributed computing applications. In a first example, "VM1" 141 on Host-A 110A, "VM3" 143 on Host-B 110B, "VM5" 145 and "VM6" 156 serve as data nodes of first distributed computing cluster 171 to execute a first distributed computing application (see related software component "App 1" 151/153/155/156). In a second example, "VM2" 142 on Host-A 110A and "VM4" 143 on Host-B 110B serve as data nodes of second distributed computing cluster 172 to execute a second distributed computing application (see related software component "App 2" 152/154). Virtual machine 141/142/143/144/145/146 executes any suitable guest operating system (OS) 161/162/163/164/165/166 to support execution of the distributed computing application.

As used herein, the term "distributed computing cluster" (e.g., Hadoop cluster) may refer generally to a group or collection of nodes that are configured to execute a distributed computing application (e.g., Hadoop application). For example, a Hadoop cluster is designed to store and analyze very large data sets (so-called "big data" measured in petabytes, etc.) in a distributed manner. A data set to be analyzed by a Hadoop cluster may be stored within a Hadoop Distributed File System (HDFS) to enable various nodes to simultaneously process different portions of the file. For a Hadoop application, virtual machine 141/142/143/144/145/146 may also have a runtime environment that executes software component code implementing various functions, such as a "Job Tracker" function, "Task Tracker" function, "Name Node" function, "Secondary Name Node" function, "Data Node" function, etc. Any suitable technology may be used, such as Hadoop MapReduce, Hadoop Yet Another Resource Negotiator (YARN), VSphere Big Data Extensions (BDE; a trademark of Vmware, Inc.), etc.

In virtualized computing environment 100, disk contention may occur when a physical host supports nodes from different distributed computing clusters. In the example in FIG. 1, for Host-A 110A to support both "VM1" 141 from first cluster 171 and "VM2" 142 from second cluster 172, both "VM1" 141 and "VM2" 142 will have to share access to the same set of disks (i.e., "Disk 1" 131A, "Disk 2" 132A to "Disk N" 13NA). When there are concurrent read/write operations from both "VM1" 141 and "VM2" 142 during I/O-intensive workload execution, the overall performance of both clusters 171, 172 may be adversely impacted by disk contentions. The same problem may also be observed when Host-B 110B is required to support "VM3" 143 from first distributed computing cluster 171 and "VM4" 144 from second distributed computing cluster 172.

Conventionally, the problem of disk contention may be mitigated using an application workload scheduler to manage workload execution on different nodes. However, the application workload scheduler is only able to schedule the workload of nodes belonging to the same cluster. For example, since both "VM5" 145 and "VM6" 146 supported by Host-C 110C belong to the same cluster 171, their I/O operations may be scheduled to reduce or avoid disk contentions. In contrast, according to existing approaches, it is impossible (or technically infeasible) to schedule I/O operations for nodes in different distributed computing clusters 171, 172, such as for "VM1" 141 and "VM2" 142 supported by Host-A 110A and for "VM3" 143 and "VM4" 144 supported by Host-B 110B.

Disk Assignment

According to examples of the present disclosure, disk assignment may be performed in virtualized computing environment 100 to reduce the likelihood of, if not avoid, disk contention and improve cluster performance. An example will be described below using FIG. 2. In the following, Host-A 110A will be used as an example "host," "VM1" 141 as an example "first virtualized computing instance" and "VM2" 142 as an example "second virtualized computing instance." The terms "first," "second," etc., are merely used for ease of discussion to distinguish one element from another, and are not used to denote a particular order.

Figure 2:
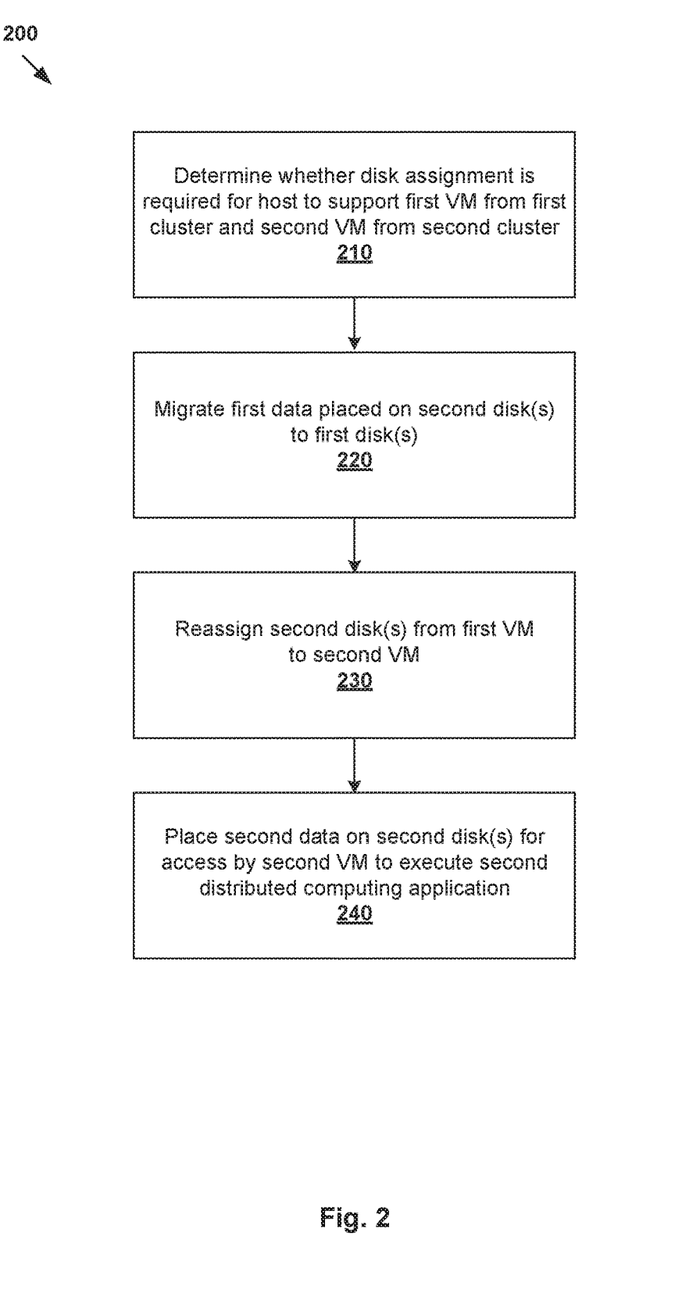
FIG. 2 is a flowchart of an example process to perform disk assignment for multiple distributed computing clusters in a virtualized computing environment.

In more detail, FIG. 2 is a flowchart of example process 200 to perform disk assignment for multiple distributed computing clusters 171, 172 in virtualized computing environment 100. Example process 200 may include one or more operations, functions, or actions illustrated by one or more blocks, such as blocks 210 to 240. The various blocks may be combined into fewer blocks, divided into additional blocks, and/or eliminated based upon the desired implementation.

At 210 in FIG. 2, it is determined whether disk assignment is required for Host-A 110A to support "VM1" 141 and "VM2" 142. For example in FIG. 1, "VM1" 141 is from first distributed computing cluster 171 to execute a first distributed computing application, and "VM2" 142 is from second distributed computing cluster 172 to execute a second distributed computing application.

At 220 in FIG. 2, in response to determination that disk assignment is required, first data is migrated from second disk(s) to first disk(s) of Host-A 110. Here, the term "first data" refers to data accessible by "VM1" 141 to execute the first distributed computing application. As will be described further using FIG. 3 and FIG. 4A, "Disk 1" 131A, "Disk 2" 132A to "Disk N" 13NA of Host-A 110A may be divided into a two sets of disks. For example, in the case of N=4, the first data may be migrated to a first set (e.g., Disk 1" 131A and "Disk 2" 132A in FIG. 4A) from a second set (e.g., "Disk 3" 133A and "Disk 4" 134A in FIG. 4A). The data migration may involve copying the first data iteratively in a block-by-block manner.

At 230 in FIG. 2, second disk(s) of Host-A 110A are reassigned from "VM1" 141 to "VM2" 142. At 240 in FIG. 2, second data is placed on second disk(s) of Host-A 110A for access by "VM2" 142 to execute the second distributed computing application. As will be described further using FIG. 3 and FIG. 4B, this may involve releasing "Disk 3" 133A and "Disk 4" 134A from "VM1" 141. Once released, disk space in "Disk 3" 133A and "Disk 4" 134A may be assigned to "VM2" 142.

The first data at 220 and second data at 230 may include any suitable data required by respective "VM1" 141 and "VM2" 142 to execute a distributed computing application. For example, the first/second data may include application data (e.g., a file, portion of a file, etc.) to be processed by virtual machine 141/142 when executing the distributed computing application. The first/second data may also include virtual machine data in the form of objects associated with virtual machine 141/142, such as virtual machine disk (VMDK) objects, snapshot objects, swap objects, home namespace objects, etc.

In one example, the determination at 210 may be performed after "VM1" 141 is deployed on Host-A 110A, but prior to deploying "VM2" 142. In this case, disk assignment for Host-A 110A may be initiated in response to a request to deploy "VM2" 142 because "VM1" 141 and "VM2" 142 are from different distributed computing clusters 171, 172. Conventionally, users (e.g., network administrators) would have to design the disk arrangement prior to the deployment of a distributed computing cluster. According to conventional approaches, if there are any changes that require the deployment of another distributed computing cluster, virtual machines from different clusters will share the same set of physical disks and disk contentions will occur.

According to examples of the present disclosure, disk assignment may be dynamically adjusted according to the deployment of new virtual machines or clusters. This improves the flexibility, adaptability and scalability of virtualized computing environment 100 to support distributed computing applications. Further, disk assignment according to example process 200 causes "VM1" 141 and "VM2" 142 to utilize different disk(s) of Host-A 110A, thereby avoiding or reducing bottlenecks in the form of disk contentions.

Examples of the present disclosure may be performed by any suitable entity or entities in virtualized computing environment 100. Since distributed computing applications are usually resource-intensive, a different entity aside from Host-A 110A may be configured as a "controller" to initiate the disk assignment. In a first example, management entity 180 may act as the controller to implement disk assignment in a centralized manner. In practice, management entity 180 may also be configured to provide management functionalities to manage various objects in virtualized computing environment 100, such as hosts 110A-110C, virtual machines 141-146, etc. In a second example, another host (e.g., "Host-D" that is not shown for simplicity) or virtual machine supported by that host may act as the controller.

In both examples, in response to the determination at 210 in FIG. 2, management entity 180 or "Host-D" may perform blocks 220 and 230 by instructing Host-A 110A to migrate data from second disk(s) to first disk(s), reassign second disk(s) from "VM1" 141 to "VM2" 142, and place second data of "VM2" 142 on the second disk(s). Host-A 110A may run an agent (e.g., disk assignment module 116A) on hypervisor 112A to receive the instructions (e.g., messages) from the controller, and perform the data migration and disk assignment accordingly. The communication between the controller and agent via physical network 104 may be implemented using any suitable network protocol, such as Representational State Transfer (REST or RESTful) Application Programming Interface (API), etc. Once the data migration completes, the agent informs the controller, which then notifies "VM1" 141 of the changes in disk assignment.

In the following, various examples will be discussed, such as a detailed process using FIG. 3, a first example of disk assignment using FIG. 4A and FIG. 4B, a second example of disk assignment using FIG. 5A and FIG. 5B, and an example computing system using FIG. 6. Although described using Host-A 110A, examples of the present disclosure may also be performed for Host-B 110B to support both"VM3" 143 and "VM4" 144, and Host-C 110C to support a node of another different cluster. In this case, Host-B 110B and Host-C 110C may each implement an agent (e.g., disk assignment module 116B/116C) to communicate with a controller (e.g., management entity 180, another host, etc.).

Detailed Process

Figure 3:
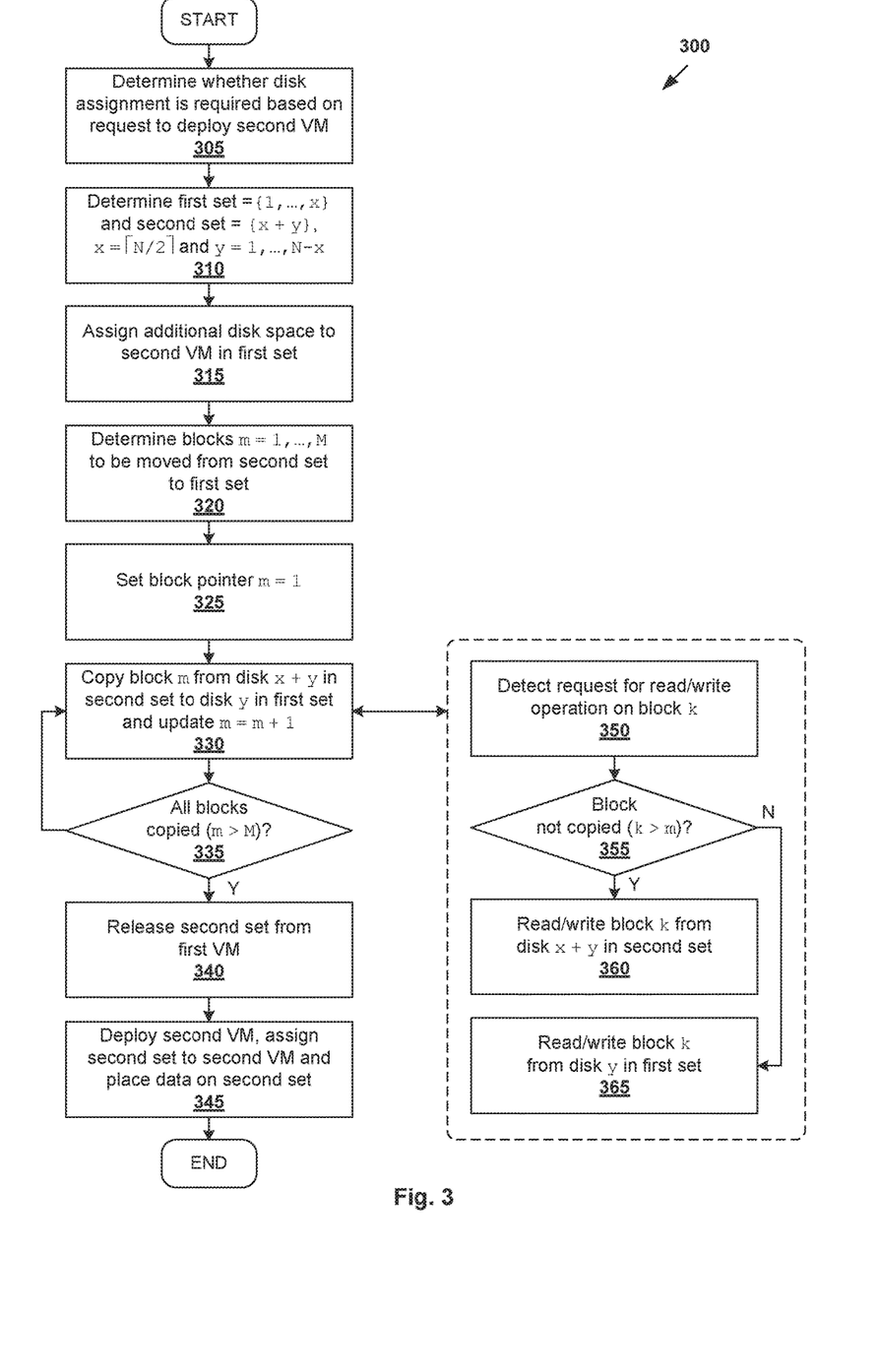
FIG. 3 is a flowchart of an example detailed process to perform disk assignment for multiple distributed computing clusters in a virtualized computing environment.

FIG. 3 is a flowchart of example detailed process 300 to perform disk assignment in virtualized computing environment 100. Example detailed process 300 may include one or more operations, functions, or actions illustrated by one or more blocks, such as blocks 305 to 365. The various blocks may be reordered, combined into fewer blocks, divided into additional blocks, and/or eliminated based upon the desired implementation.

At 305 in FIG. 3, in response to receiving a request to deploy "VM2" 142 on Host-A 110A, it is determined whether disk assignment is required. The request may be a scheduled deployment or placement of "VM2" 142, or a real-time request (e.g., received by management entity 180). Using the example in FIG. 1, "VM2" 142 is to serve as a node of second cluster 172 to execute a workload of second distributed computing application (see "App 2" 152). Since Host-A 110A is already supporting "VM1" 141 that serves as a node of first cluster 171, disk assignment is required to avoid disk contention between "VM1" 141 and "VM2" 142.

Figure 4A:
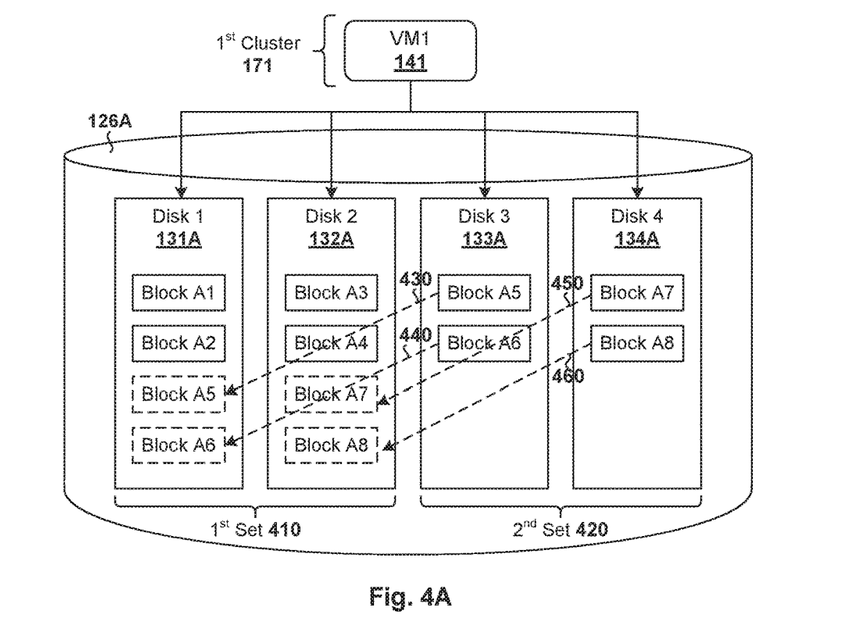
FIG. 4A is a schematic diagram illustrating a first example of disk assignment in which first data of a first virtual machine is migrated from second disks to first disks.
Figure 5A:
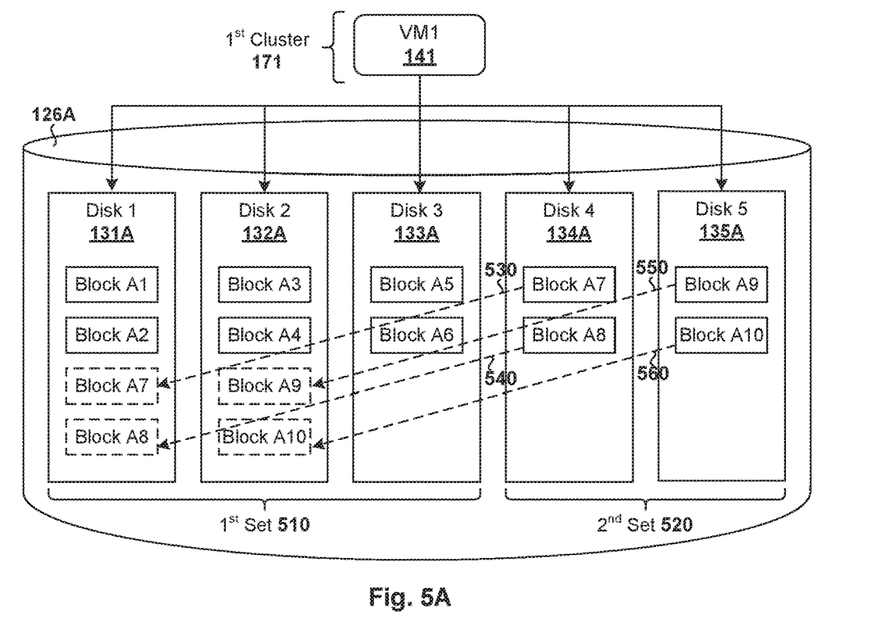
FIG. 5A is a schematic diagram illustrating a second example of disk assignment in which first data of a first virtual machine is migrated from second disks to first disks.

To illustrate the potential disk contention in more detail, FIG. 4A is a schematic diagram illustrating a first example of disk assignment in which first data of first virtual machine 141 is migrated from second disks to first disks. In this example, "VM1" 141 is assigned with "Disk 1" 131A, "Disk 2" 132A, "Disk 3" 133A and "Disk 4" 134A of storage resource 126A of Host-A 110A. In the example in FIG. 4A, HDFS is employed to utilize all available hard disks to maximize I/O throughput.

First data required by "VM1" 141 to execute a workload of the first distributed computing application (e.g., "App 1" 151 in FIG. 1) may be stored in the form of blocks. The block size is configurable, such as 64 MB by default, etc. All read and write operations are performed in a block-by-block manner. In the example in FIG. 4A, the first data includes "Block A1" and "Block A2" that are placed on "Disk 1" 131A; "Block A3" and "Block A4" on "Disk 2" 132A; "Block A5" and "Block A6" on "Disk 3" 133A; and "Block A7" and "Block A8" on "Disk 4" 134A. Conventionally, "VM2" 142 will be deployed without considering whether another virtual machine from a different cluster is already using the same set of disks. In this case, second data required by "VM2" 142 will also be placed on disks 131A-134A, thereby causes disk contentions between "VM1" 141 and "VM2" 142 when both are trying to access the same disks.

At 310 in FIG. 3, in response to determination that disk assignment is required, the disks on which first data of "VM1" 141 is placed are divided into two sets. In one example, the division is based on x=[N/2], where N is the number of disks and x is the ceiling of N divided by two. This creates a first set={1, ..., x} and a second set={x+y} for y=1, ..., N−x. In the case of N=4 and x=2 in FIG. 4A, first set={1,2} representing "Disk 1" 131A and "Disk 2" 132A (see 410), and second set={3, 4} representing "Disk 3" 133A and "Disk 4" 134A (see 420).

At 315 in FIG. 3, additional disk space (e.g., measured in GB) is assigned to "VM1" 141. For example, the amount of disk space required on disk y in first set 410 may be increased based on that on disk x +y in second set 410. In the case of y=1, additional disk space on "Disk 1" 131A is assigned based on corresponding assigned disk space on "Disk 3" 133A. Similarly, for the case of y=2, the amount of assigned disk space on "Disk 2" 132A is increased based on that on corresponding "Disk 4" 134A. In practice, when Host-A 110A is only supporting "VM1" 141, C/N amount of disk space may be assigned to "VM1" 141 in each of the N=4 disks based on a total requirement of C. When N=4 of originally occupied disks is reduced to x=[N/2]=2, the amount of disk space assigned to "VM1" 141 on "Disk 1" 131A and "Disk 2" 132A is adjusted from C/4 to C/2 (i.e., doubled).

At 320 in FIG. 3, blocks m=1, ..., M to be migrated from second set 420 are determined. For example in FIG. 4A, the total number of blocks is M=4 and migration of "Block A5" (m=1), "Block A6" (m=2), "Block A7" (m=3) and "Block A8" (m=4) is required.

At 325, 330 and 335 in FIG. 3, blocks are copied from disk x +y in second set 420 to disk y in first set 410 in a block-by-block manner from m=1, ..., M and y=1, ..., N−x. Block pointer m is iteratively incremented to keep track of the number of blocks copied. For example in FIG. 4A, "Block A5" is migrated from "Disk 3" 133A to "Disk 1" 131A at a first iteration (see 430) and "Block A6" is migrated at a second iteration (see 440). Further, "Block A7" is migrated from "Disk 4" 134A to "Disk 2" 132A at a third iteration (see 450) and "Block A8" is migrated at a fourth iteration (see 460).

At 340 in FIG. 3, once all blocks are copied from second set 420 to first set 410 (i.e., block pointer m>M), second set 420 is released from "VM1" 141, such as by marking "Disk 3" 133A and "Disk 4" 134A as detached to release the disk space previously assigned to "VM1" 141.

At 345 in FIG. 3, "VM2" 142 is deployed on Host-A 110A and assigned with "Disk 3" 133A and "Disk 4" 134A in second set 420 to store second data required by "VM2" 142 to execute the second distributed computing application. Similar to the above examples, C'/2 amount of disk space may be assigned to "VM2" 142 in each disk 133A/134A based on a total of C' amount of disk space required by "VM2" 142.

Figure 4B:
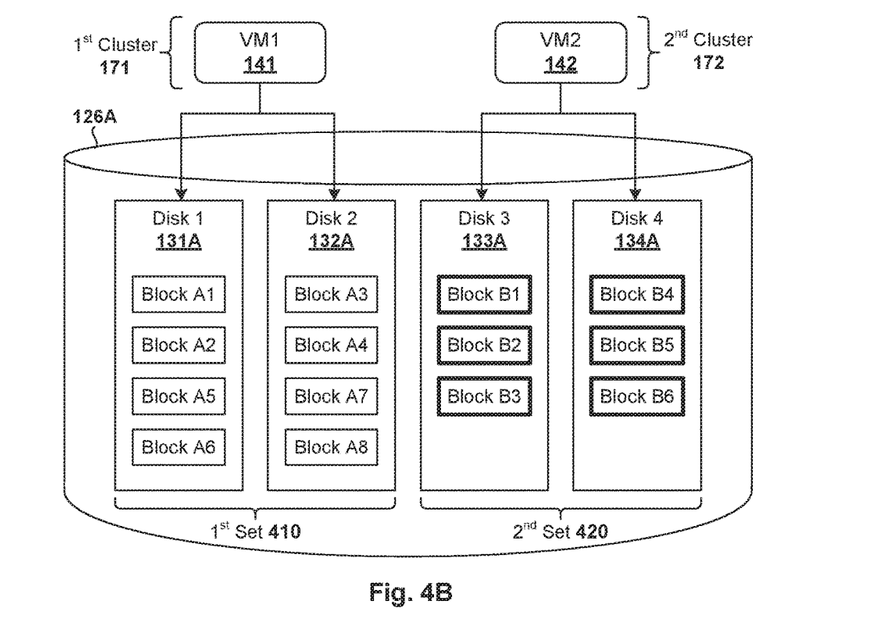
FIG. 4B is a schematic diagram illustrating a first example of disk assignment in which second data of a second virtual machine is placed on second disks.

FIG. 4B is a schematic diagram illustrating a first example of disk assignment in which second data of second virtual machine 142 is placed on second disks. In this example, "Block B1," "Block B2" and "Block B3" are placed on "Disk 3" 133A; and "Block B4," "Block B5" and "Block B6" on "Disk 4" 134A (i.e., second data; shown in bold). After performing example process 300, each disk is only accessed by one virtual machine from a particular cluster to avoid disk contentions between "VM1" 141 and "VM2" 142.

The above data migration process merges data blocks of "VM1" 141 to half of the originally occupied disks. In practice, a cold merge may lead to service interruption and is suitable when "VM1" 141 is not operating. Otherwise, a hot merge approach may be used to allow "VM1" 141 to continue its read/write operations to and from "Disk 1" 131A, "Disk 2" 132A, "Disk 3" 133A and "Disk 4" 134A. An example will be described below.

At 350 in FIG. 3, a request for a read/write operation on block k (1≤k≤M) is detected during the copying or merging process according to 325-335 in FIG. 3. At 355 in FIG. 3, it determined whether block k has been copied from second set 420 to first set 410 based on block pointer m that is indicative of the number of blocks copied. At 360 in FIG. 3, if block k has not been copied (i.e., k>m), the read/write operation on block k is allowed to be performed on its original disk in second set 420. Otherwise, at 365 in FIG. 3 (i.e., block k≤m has already been copied), the read/write operation on block k is allowed to be performed on its new disk location in first set 410.

Using the example in FIG. 4A, consider the scenario of m=2 where two blocks (i.e., "Block A5" and "Block A6") have been copied from "Disk 3" 133A to "Disk 1" 131A. If a request for a read operation on "Block A5" (i.e.,=1≤m=2) is detected, "Block A5" will be read from its new "Disk 1" 131A ("particular first disk") in first set 410. Otherwise, if a read operation on "Block A7" (i.e., k=3>m=2) is requested, "Block A7" will be read from its original "Disk 4" 134A ("particular second disk") in second set 420.

Similarly, if a write operation on "Block A6" (i.e., k=2≤m=2) is requested, "Block A6" will be written to its new "Disk 1" 131A in first set 410. Otherwise, if a write operation on "Block A8" (i.e., k=4>m=2) is requested, "Block A8" will be written to its original "Disk 4" 134A in second set 420. This way, "VM1" 141 may continue its read/write operations during the data migration process to reduce the likelihood of service interruption.

FIG. 4A and FIG. 4B above illustrate an example in which N=4 is an even number. In another example in FIG. 5A and FIG. 5B, storage resource 126A may include an odd number of disks, such as N=5. In particular, FIG. 5A is a schematic diagram illustrating a second example of disk assignment in which first data of first virtual machine 141 is migrated from second disks to first disks. In addition to disks 131A-134A in FIG. 4A, storage resource 126A of Host-A 110A includes "Disk 5" 135A. Since N is an odd number, one of the disks (e.g., middle "Disk 3" 133A) may be left untouched.

For example, according to 310 and 320 in FIG. 3, x=[N/2]=3 may be calculated to create first set={1, 2, 3} representing "Disk 1" 131A, "Disk 2" 132A and "Disk 3" 133A (see 510), and second set={4, 5} (i.e., y=1, 2) representing "Disk 4" 134A and "Disk 5" 135A (see 520). According to 315 to 335 in FIG. 3, various blocks of "VM1" 141 are migrated from second set 520 to first set 520, such as by copying "Block A7" (see 530) and "Block A8" (see 540) from "Disk 4" 134A to "Disk 1" 131A, and "Block A9" (see 550) and "Block A1 0" (see 560) from "Disk 5" 135A to "Disk 2" 132A.

Figure 5B:
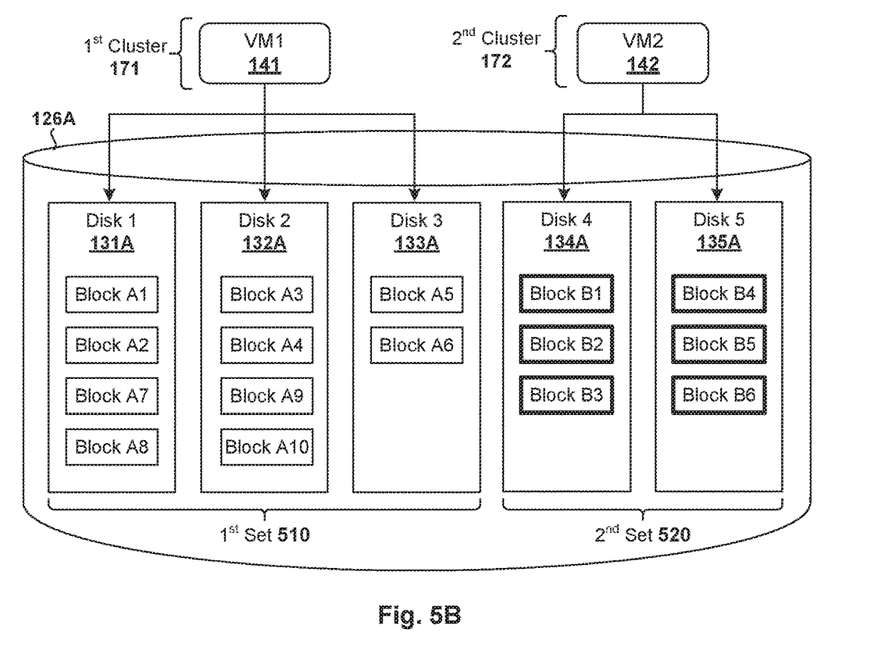
FIG. 5B is a schematic diagram illustrating a second example of disk assignment in which second data of a second virtual machine is placed on second disks.
Figure 6:
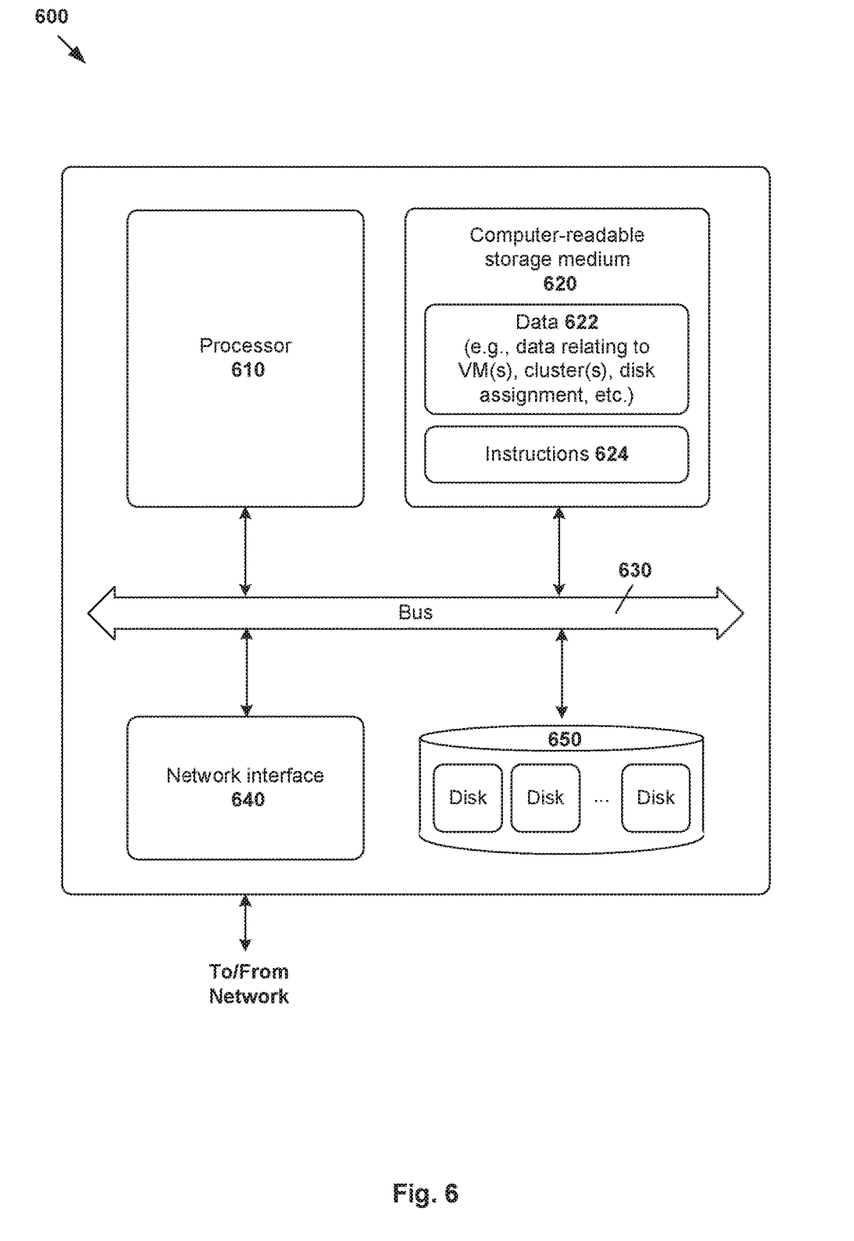
FIG. 6 is a schematic diagram illustrating an example computing system configured to perform disk assignment for multiple distributed computing clusters in a virtualized computing environment.

FIG. 5B is a schematic diagram illustrating a second example of disk assignment in which second data of second virtual machine 142 is placed on second disks. Similar to the example in FIG. 4B, "Block B1," "Block B2" and "Block B3" are placed on "Disk 3" 133A; and "Block B4," "Block B5" and "Block B6" on "Disk 4" 134A (new data blocks shown in bold). As such, after performing example process 300, "Disk 1" 131A, "Disk 2" 132A and "Disk 3" 133A are accessed by "VM1" 141, and "Disk 4" 134A and "Disk 5" 135A by "VM2" 142 to avoid disk contentions between them.

Although two virtual machines are described above, it should be understood that examples of the present disclosure may be applied to support additional virtual machines to share access to storage resource 126A of Host-A 110. For example, when a third virtual machine (e.g., "VM7") is deployed on Host-A 110 to serve as a data node for a third distributed computing cluster, the disk assignment may be modified accordingly. For simplicity, examples of the present disclosure assume that local disks are used as data disks (e.g., for HDFS usage), and OS-related data placed on a shared data store. In practice, however, any alternative configuration may be used depending on the desired implementation.

Computing System

The above examples can be implemented by hardware (including hardware logic circuitry), software or firmware or a combination thereof. FIG. 6 is a schematic diagram illustrating example computing system 600 configured to perform disk assignment for multiple distributed computing clusters 171, 172 in virtualized computing environment 100. Computing system 600 may be configured to implement or act as management entity 180 or host (e.g., 110A/110B/110C).

Example computing system 600 may include processor 610, computer-readable storage medium 620, network interface 640, storage resource 650 (e.g., multiple disks) and bus 630 that facilitates communication among these illustrated components and other components. Processor 610 is to perform processes described herein with reference to the drawings. Computer-readable storage medium 620 may store any suitable data 622, such as data relating to virtual machine(s), distributed computing cluster(s), distributed computing application(s), disk assignment, etc. Computer-readable storage medium 620 may further store computer-readable instructions 624 (e.g., program code) that, in response to execution by processor 610, cause processor 610 to perform processes described herein with reference to FIG. 1 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), programmable switch architectures, and others. The term 'processor' is to be interpreted broadly to include a processing unit, ASIC, logic unit, or programmable gate array, etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, where the elements or procedure shown in the drawings are not necessarily essential for implementing the present disclosure. Those skilled in the art will understand that elements in the examples can be arranged in the device in the examples as described, or can be alternatively located in one or more devices different from that in the examples. The elements in the examples described can be combined into one module or further divided into a plurality of sub-elements.

We claim:

1. A method to perform disk assignment for multiple distributed computing clusters in a virtualized computing environment, the method comprising:

determining whether disk assignment is required for a host in the virtualized computing environment to support a first virtualized computing instance and a second virtualized computing instance, wherein the first virtualized computing instance is from a first distributed computing cluster to execute a first distributed computing application and the second virtualized computing instance is from a second distributed computing cluster to execute a second distributed computing application; and after the first virtualized computing instance has been deployed to access a storage resource of the host and in response to a request to deploy the second virtualized computing instance and the first virtualized computing instance and the second virtualized computing instance being configured to access the same storage resource:

migrating first data from one or more second disks to one or more first disks of the host, wherein the first data is for access by the first virtualized computing instance to execute the first distributed computing application;

reassigning the one or more second disks assigned to the first virtualized computing instance to the second virtualized computing instance; and placing second data on the reassigned one or more second disks, wherein the second data is for access by the second virtualized computing instance to execute the second distributed computing application.

2. The method of claim 1, wherein the method further comprises:
    prior to migrating the data accessible by the first virtualized computing instance, dividing multiple disks of the host into the one or more first disks representing a first set and the one or more second disks representing a second set.

3. The method of claim 1, wherein the migrating the first data comprises:
    iteratively copying multiple blocks of the first data from the one or more second disks to the one or more first disks, and updating a block pointer indicative of a number of the multiple blocks that have been copied.

4. The method of claim 3, wherein the method further comprises:
    in response to detecting a request for a read or write operation on a particular block of the multiple blocks, determining whether the particular block has been copied from a particular second disk of the one or more second disks to a particular first disk of the one or more first disks based on the block pointer.

5. The method of claim 4, wherein the method further comprises:
    in response to determination that the particular block has been copied, allowing the read or write operation to be performed on the particular block on the particular first disk; but otherwise, allowing the read or write operation to be performed on the particular block on the particular second disk.

6. The method of claim 1, wherein the reassigning the one or more second disks comprises:
    releasing each of the one or more second disks from the first virtualized computing instance; and
    assigning each of the one or more second disks to the second virtualized computing instance.

7. A non-transitory computer-readable storage medium comprising instructions, which when executed in a computing system, cause the computing system to perform a method of disk assignment for multiple distributed computing clusters in a virtualized computing environment, the method comprising:
    determining whether disk assignment is required for a host in the virtualized computing environment to support a first virtualized computing instance and a second virtualized computing instance, wherein the first virtualized computing instance is from a first distributed computing cluster to execute a first distributed computing application and the second virtualized computing instance is from a second distributed computing cluster to execute a second distributed computing application; and
    after the first virtualized computing instance has been deployed to access a storage resource of the host and in response to a request to deploy the second virtualized computing instance and the first virtualized computing instance and the second virtualized computing instance being configured to access the same storage resource:
        migrating first data from one or more second disks to one or more first disks of the host, wherein the first data is for access by the first virtualized computing instance to execute the first distributed computing application;
        reassigning the one or more second disks assigned to the first virtualized computing instance to the second virtualized computing instance; and
        placing second data on the reassigned one or more second disks, wherein the second data is for access by the second virtualized computing instance to execute the second distributed computing application.

8. The non-transitory computer-readable storage medium of claim 7, wherein the method further comprises:
    prior to migrating the data accessible by the first virtualized computing instance, dividing multiple disks of the host into the one or more first disks representing a first set and the one or more second disks representing a second set.

9. The non-transitory computer-readable storage medium of claim 7, wherein the migrating the first data comprises:
    iteratively copying multiple blocks of the first data from the one or more second disks to the one or more first disks, and updating a block pointer indicative of a number of the multiple blocks that have been copied.

10. The non-transitory computer-readable storage medium of claim 9, wherein the method further comprises:
    in response to detecting a request for a read or write operation on a particular block of the multiple blocks, determining whether the particular block has been copied from a particular second disk of the one or more second disks to a particular first disk of the one or more first disks based on the block pointer.

11. The non-transitory computer-readable storage medium of claim 10, wherein the method further comprises:
    in response to determination that the particular block has been copied, allowing the read or write operation to be performed on the particular block on the particular first disk; but otherwise, allowing the read or write operation to be performed on the particular block on the particular second disk.

12. The non-transitory computer-readable storage medium of claim 7, wherein the reassigning the one or more second disks comprises:
    releasing each of the one or more second disks from the first virtualized computing instance; and
    assigning each of the one or more second disks to the second virtualized computing instance.

13. A computing system, comprising:
    a processor;
    multiple disks that include one or more first disks and one or more second disks; and
    a non-transitory computer-readable medium having stored thereon program code that, upon being executed by the processor, causes the processor to:
    determine whether disk assignment is required for a host in a virtualized computing environment to support a first virtualized computing instance and a second virtualized computing instance, wherein the first virtualized computing instance is from a first distributed computing cluster to execute a first distributed computing application and the second virtualized computing instance is from a second distributed computing cluster to execute a second distributed computing application; and
    after the first virtualized computing instance has been deployed to access a storage resource of the host and in response to a request to deploy the second virtualized computing instance and the first virtualized computing instance and the second virtualized computing instance being configured to access the same storage resource:
        migrate first data from one or more second disks to one or more first disks of the host, wherein the first data is for access by the first virtualized computing instance to execute the first distributed computing application;

reassign the one or more second disks assigned to the first virtualized computing instance to the second virtualized computing instance; and place second data on the reassigned one or more second disks, wherein the second data is for access by the second virtualized computing instance to execute the second distributed computing application.

14. The computing system of claim 13, wherein the program code further causes the processor to:

prior to migrating the data accessible by the first virtualized computing instance, divide the multiple disks into the one or more first disks representing a first set and the one or more second disks representing a second set.

15. The computing system of claim 13, wherein program code for migrating the first data causes the processor to:

copy multiple blocks of the first data from the one or more second disks to the one or more first disks iteratively, and update a block pointer indicative of a number of the multiple blocks that have been copied.

16. The computing system of claim 15, wherein program code further causes the processor to:

in response to detecting a request for a read or write operation on a particular block of the multiple blocks, determine whether the particular block has been copied from a particular second disk of the one or more second disks to a particular first disk of the one or more first disks based on the block pointer.

17. The computing system of claim 16, wherein program code further causes the processor to:

in response to determination that the particular block has been copied, allow the read or write operation to be performed on the particular block on the particular first disk; but otherwise, allow the read or write operation to be performed on the particular block on the particular second disk.

18. The computing system of claim 13, wherein program code for reassigning the one or more second disks causes the processor to:

release each of the one or more second disks from the first virtualized computing instance; and assign each of the one or more second disks to the second virtualized computing instance.

* * * * *